United States Patent [19]

Rubin

[11] Patent Number: 5,441,124
[45] Date of Patent: Aug. 15, 1995

[54] VEHICULAR ANTI-THEFT LIFT APPARATUS

[76] Inventor: Israel M. Rubin, 505 S. Beverly Dr. #101, Beverly Hills, Calif. 90212

[21] Appl. No.: 203,928

[22] Filed: Mar. 1, 1994

[51] Int. Cl.⁶ .......................... B60R 25/00; B60S 9/02
[52] U.S. Cl. .................................. 180/287; 280/766.1
[58] Field of Search ...................... 180/287; 280/763.1, 280/764.1, 765.1, 766.1

[56] References Cited

U.S. PATENT DOCUMENTS

| | | | |
|---|---|---|---|
| 2,190,489 | 2/1940 | Sellinger et al. | 180/287 |
| 4,360,074 | 11/1982 | Parquet | 180/287 |
| 4,955,450 | 9/1990 | Deinlein-Kalb et al. | 280/763.1 |

FOREIGN PATENT DOCUMENTS 2460233  2/1981  France .............................. 280/763.1

Primary Examiner—Kenneth R. Rice

[57] ABSTRACT

A mounting plate secured to a vehicular axle includes an elevator plate adjustably spaced from the mounting plate employing plural pairs of toggle links, wherein the toggle links are actuated by a piston rod. The piston rod is arranged for retraction to the first toggle links to effect opening of the toggle links and their spacing of the elevator plate relative to the mounting plate. A pump structure is arranged to direct pressurized air to the piston mounted to said piston rod, such that upon deactivation of the ignition switch within the associated vehicle, the pump is deactivated to direct the piston and the piston rod in a spaced relationship relative to the first toggle link pair and project the elevator plate relative to the mounting plate and thereby elevate the vehicle axle relative to an underlying support surface.

7 Claims, 4 Drawing Sheets

VEHICULAR ANTI-THEFT LIFT APPARATUS

BACKGROUND OF THE INVENTION

1. Field of the Invention

The field of invention relates to vehicular anti-theft structure, and more particularly pertains to a new and improved vehicular anti-theft lift apparatus wherein the same is arranged for lifting of a vehicle during non-use of said vehicle.

2. Description of the Prior Art

Vehicle anti-theft structure and apparatus related thereto is exemplified in the prior art by the U.S. Pat. Nos. 4,928,506; 4,037,684; 4,934,479; 4,360,074; and 5,040,826.

The instant invention attempts to address a manner of preventing vehicular theft and unauthorized use associated therewith, wherein an elevator structure is arranged in a mounted relationship relative to the drive housing of the vehicle such that upon discontinuance of operation of the vehicle, the elevator structure is actuated to lift the drive housing relative to an underlying support surface and in this respect, the present invention substantially fulfills this need.

SUMMARY OF THE INVENTION

In view of the foregoing disadvantages inherent in the known types of vehicular anti-theft structure now present in the prior art, the present invention provides a vehicular anti-theft lift apparatus wherein the same is directed to the automatic actuation of an elevator structure to raise a vehicular drive axle relative to an underlying support surface. As such, the general purpose of the present invention, which will be described subsequently in greater detail, is to provide a new and improved vehicular anti-theft lift apparatus which has all the advantages of the prior art vehicular anti-theft apparatus and none of the disadvantages.

To attain this, the present invention provides a mounting plate secured to a vehicular axle, including an elevator plate adjustably spaced from the mounting plate employing plural pairs of toggle links, wherein the toggle links are actuated by a piston rod. The piston rod is arranged for retraction to the first toggle links to effect opening of the toggle links and their spacing of the elevator plate relative to the mounting plate. A pump structure is arranged to direct pressurized air to the piston mounted to said piston rod, such that upon deactivation of the ignition switch within the associated vehicle, the pump is deactivated to direct the piston and the piston rod in a spaced relationship relative to the first toggle link pair and project the elevator plate relative to the mounting plate and thereby elevate the vehicle axle relative to an underlying support surface.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular anti-theft lift apparatus which has all the advantages of the prior art vehicular anti-theft apparatus and none of the disadvantages.

It is another object of the present invention to provide a new and improved vehicular anti-theft lift apparatus which may be easily and efficiently manufactured and marketed.

It is a further object of the present invention to provide a new and improved vehicular anti-theft lift apparatus which is of a durable and reliable construction.

An even further object of the present invention is to provide a new and improved vehicular anti-theft lift apparatus which is susceptible of a low cost of manufacture with regard to both materials and labor, and which accordingly is then susceptible of low prices of sale to the consuming public, thereby making such vehicular anti-theft lift apparatus economically available to the buying public.

Still yet another object of the present invention is to provide a new and improved vehicular anti-theft lift apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings, and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
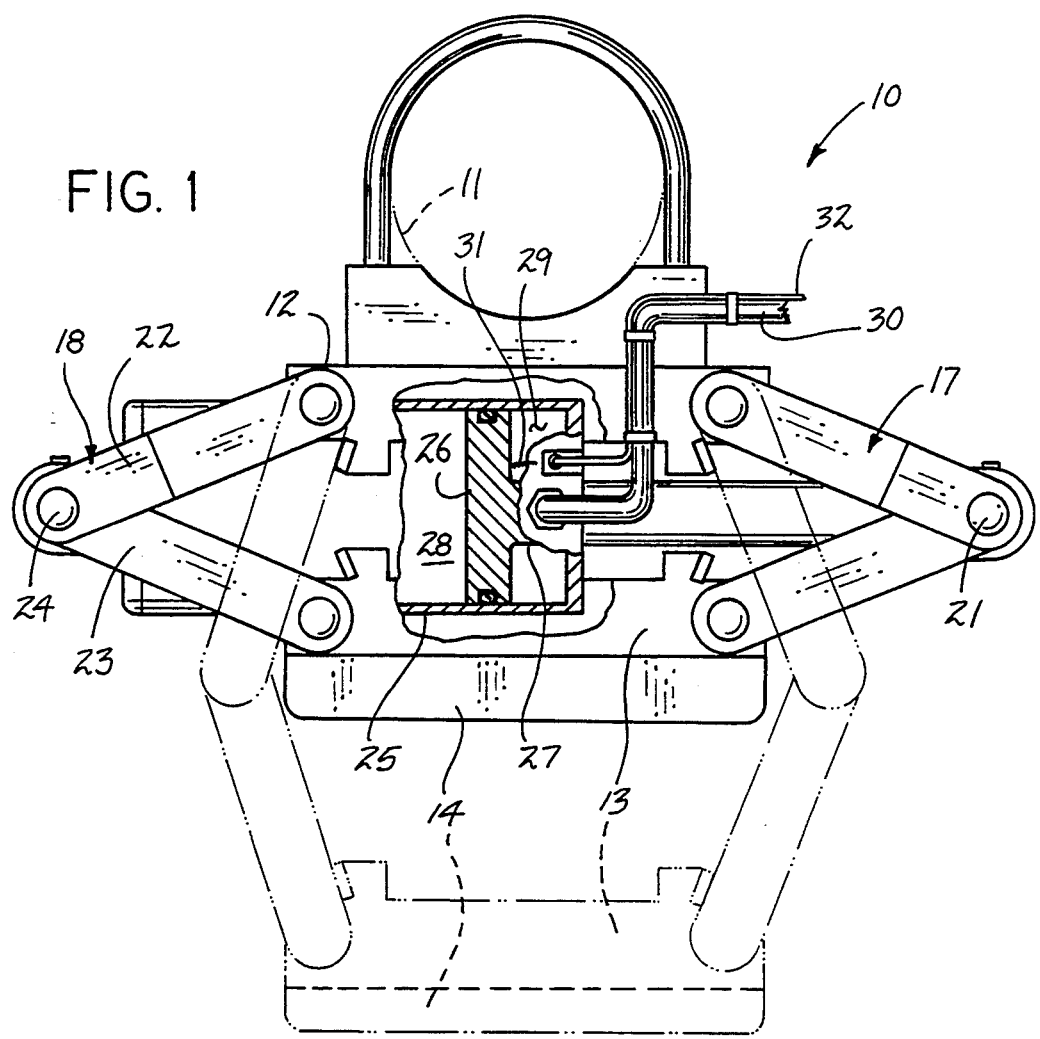
FIG. 1 is an orthographic view of the lift structure of the invention.
Figure 2:
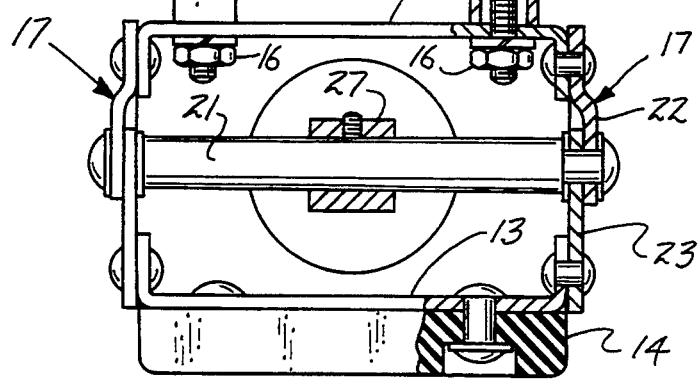
FIG. 2 is an orthographic end view of the lift structure.
Figure 3:
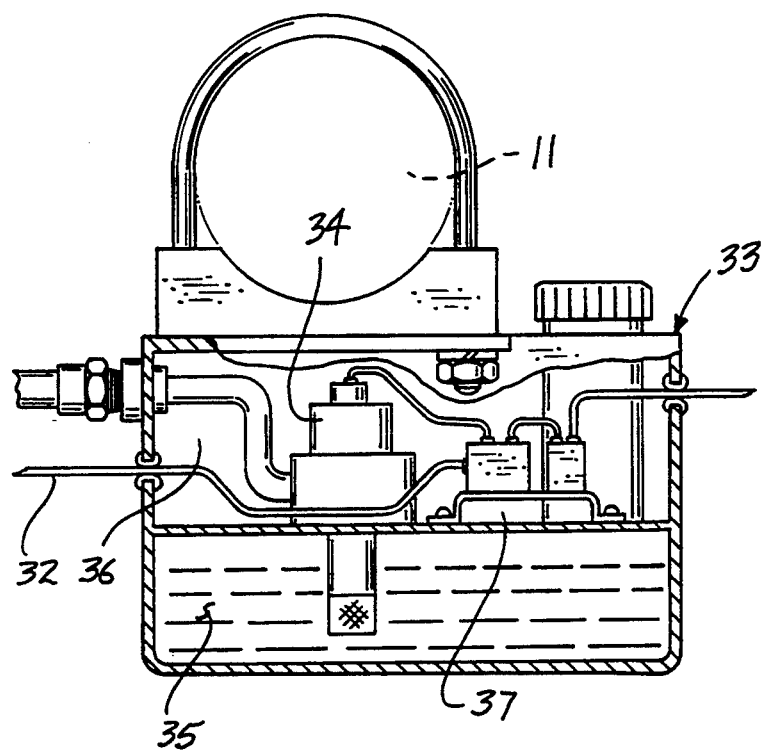
FIG. 3 is an orthographic view, partially in cross-section, of the pump structure mounted to the vehicular axle in association with the lift structure, as indicated in FIG. 1.

With reference now to the drawings, and in particular to FIGS. 1 to 8 thereof, a new and improved vehicular anti-theft lift apparatus embodying the principles and concepts of the present invention and generally designated by the reference numeral 10 will be described.

More specifically, the vehicular anti-theft lift apparatus 10 of the instant invention essentially comprises mounting of an elevator structure, as indicator in FIG. 1, to a vehicular axle housing 11. Such mounting is desired particularly in adjacency to a differential portion typically positioned medially of the drive axle, such that upon the elevator structure extending as illustrated in phantom, the drive axle is raised relative to an underlying support surface. A mounting plate 12 is secured to the axle housing 11 employing clamp members 15 of a U-shaped configuration extending about the axle housing and having fasteners 16 securing the clamp members to the mounting plate 12. An elevator plate 13 is extensibly and retractably mounted relative to the mounting plate 12 in a spaced parallel relationship thereto employing plural pairs of links having first and second link pairs 17 and 18 mounted in opposed first and second ends of the elevator and mounting plates 13 and 12 respectively. The elevator plate 13 is formed with a cushion 14 secured to the elevator plate to prevent marring to an underlying support surface. To this end, various replacement pads such as first, second, and third pads 41, 42, and 43 (see FIG. 6) are provided for use in snow, ice, and providing for an extended surface respectively, such that the first pad 41 includes arcuate gripping teeth, while the second pad 42 includes spiked pointed teeth for engaging underlying ice and the like.

Each first link pair of said first link pairs 17 is indicated by a first axle 21 that joins a first and second link plate 19 and 20 respectively of each first link pair. The first and second link plates are pivotally mounted to the respective mounting and elevator plates 12 and 13 respectively. Each second link pair of said second link pairs includes respective third and fourth link plates 22 and 23 mounted to the respective mounting and elevator plate structure 12 and 13, with the first, third, and fourth link plates pivotally mounted to a second axle 24, with the second axle 24 interconnecting the second link pairs together.

A piston chamber housing 25 is fixedly mounted to the mounting plate between the mounting plate and the elevator plate such that the piston chamber housing 25 includes a piston 26 reciprocatably mounted therewithin dividing the piston chamber housing 25 into a first and second chamber 28 and 29 respectively within the piston chamber housing. A piston rod 27 fixedly and orthogonally mounted medially of the piston 26 extends through the piston chamber housing 25 and is pivotally mounted about the first axle 21, such that projection of the piston 26 within the piston chamber housing 25 from the first axle towards the second axle effects extension of the elevator plate relative to the mounting plate, whereupon conversely, upon pressurizing of the second chamber 29 within the piston chamber housing 25 during normal operation of the associated motor vehicle, the elevator plate is retracted towards the mounting plate, as illustrated in solid line in FIG. 1. To maintain pressure within the second chamber 29 during operation of the vehicle, a pressure conduit 30 is directed into the pressure chamber housing 25 between the piston 26 and the piston chamber housing floor within the second chamber 29 towards the first axle 21.

Figure 4:
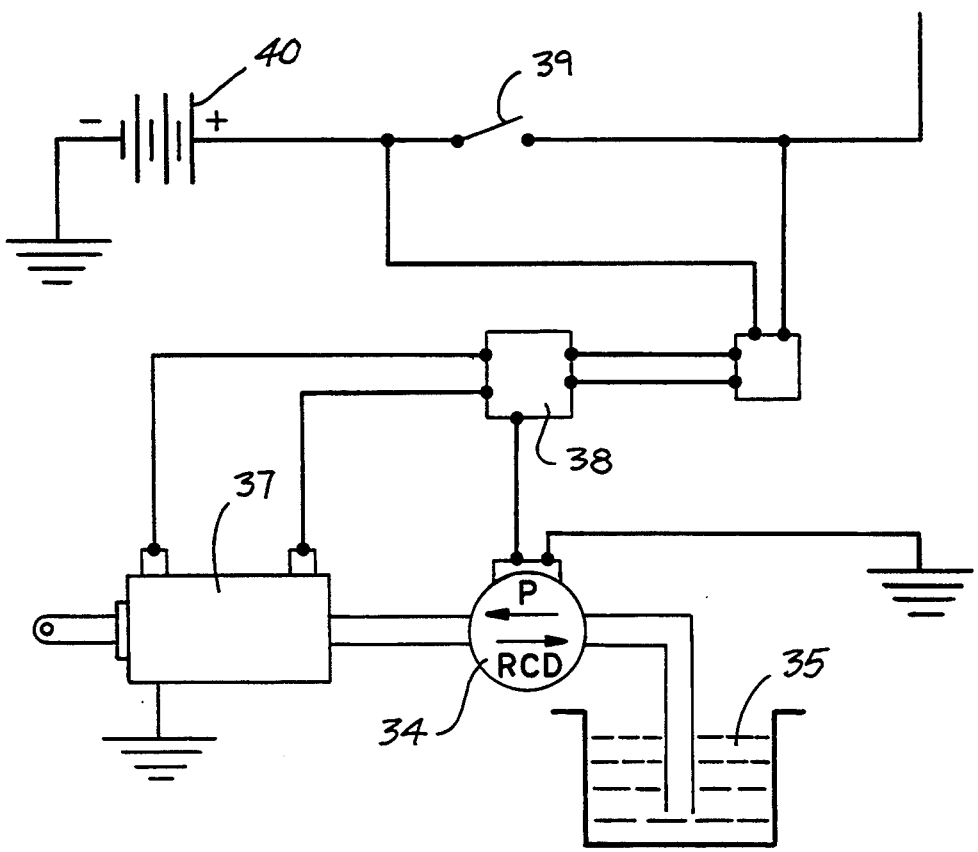
FIG. 4 is a schematic illustration of the pump in cooperation with the ignition switch structure of an associated vehicle.
Figure 5:
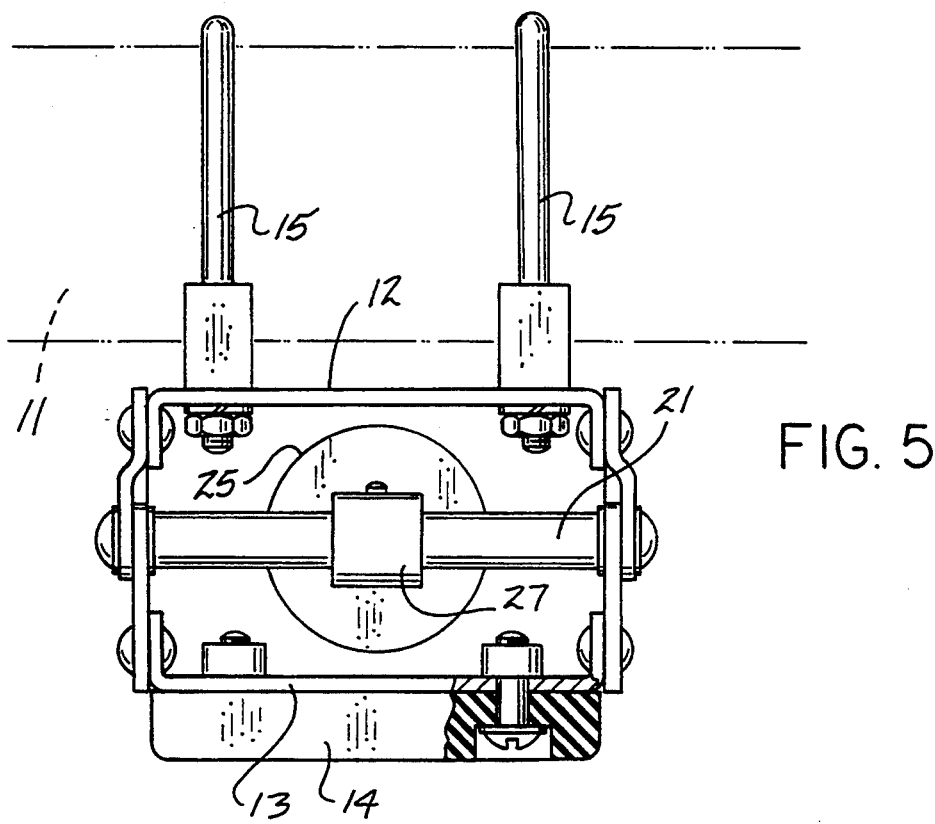
FIG. 5 is an orthographic end view indicating the piston rod mounted to the axle connecting the first link pair.
Figure 6:
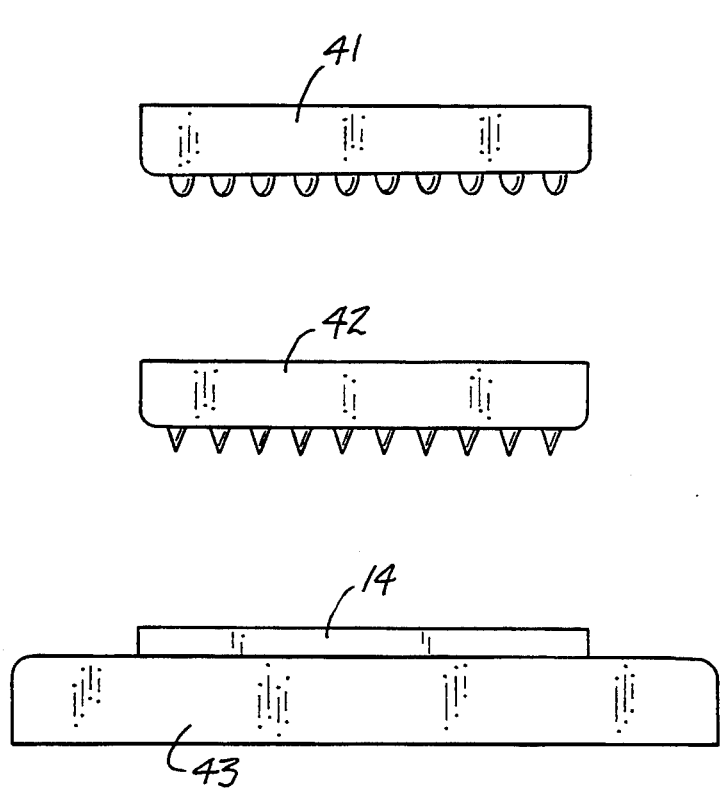
FIG. 6 is an orthographic view of replacement pads for use by the invention.

The FIG. 4 indicates the use of a pump housing 33 that is mounted to the axle housing 11, typically in a spaced adjacency relative to the elevator structure, such as indicated in FIG. 1. The pump housing 33 includes a pump 34 mounted therewithin, with a fluid chamber 35 separated from a drive chamber 36 within the pump housing 33. A pump 34 of a constant delivery reversing pump structure is mounted within the fluid chamber 35 to direct fluid therefrom to the second chamber 29, as noted above. A position sensor member 37 mounted within the second chamber 29, as illustrated in FIG. 1, senses positioning of the piston 26 to permit reversing of the pump 34 to permit sensing of the piston in the first position, with the elevator structure extended as indicated in phantom, such that upon the opening of the ignition switch 39 of the associated vehicle in cooperation with the vehicular battery 40, actuation of the pump 37 is discontinued, deflecting the piston to the first position, as indicated in FIG. 1, from a second position when the elevator plate is in the retracted position, as indicated in solid line in FIG. 1.

Figure 7:
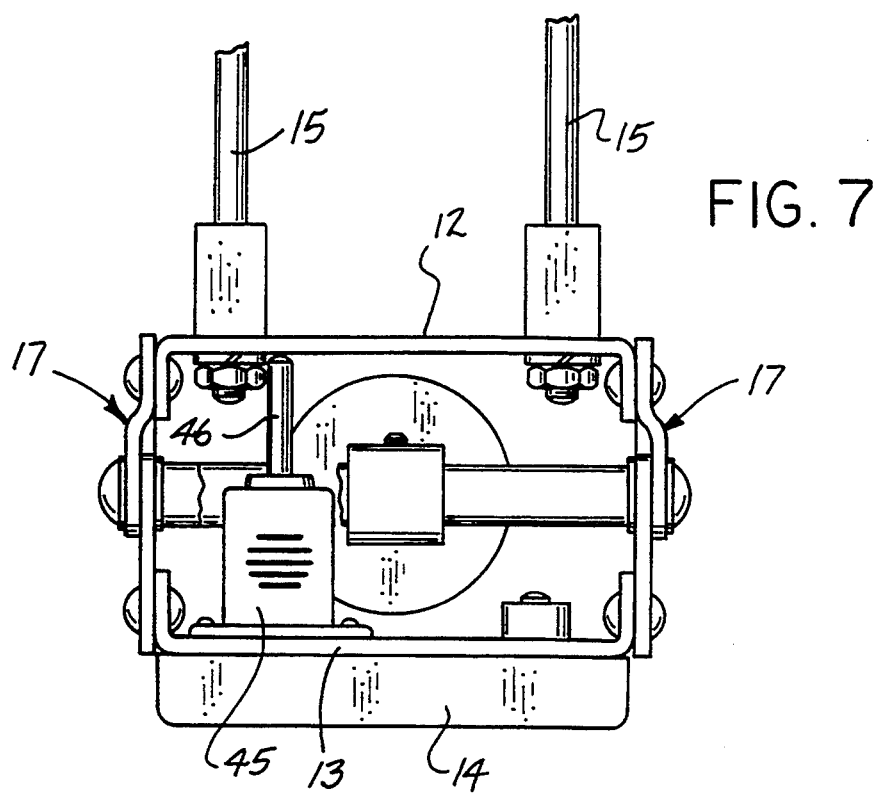
FIG. 7 is an orthographic end view of an audible alarm switch structure mounted within the elevator structure.
Figure 8:
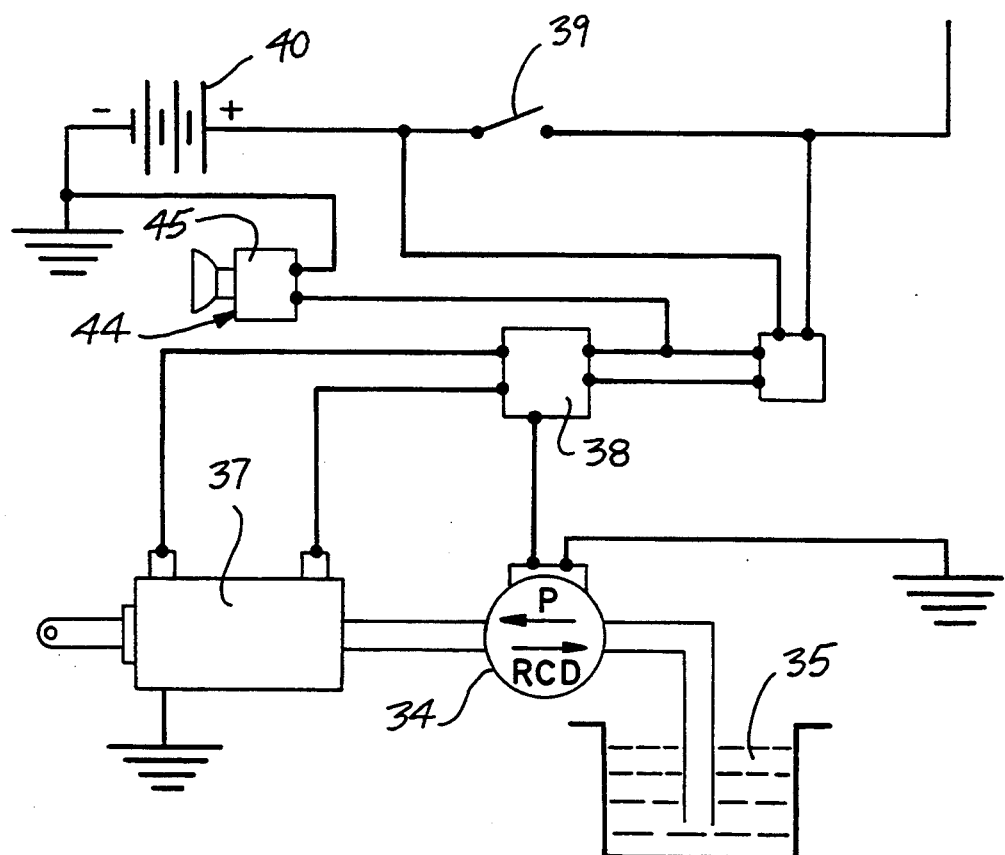
FIG. 8 is a diagrammatic illustration of the audible alarm signal structure in association with the apparatus.

The FIGS. 7 and 8 indicates the further optional employment of an audio alarm housing 44, including an audio alarm switch 45 secured to the elevator plate 13 in a facing relationship relative to the mounting plate 12. The housing 44 includes an alarm rod 46 in biased projection from the housing 44 towards the elevator plate, such that upon unauthorized attempt to compress the elevator plate to the mounting plate, the alarm rod 46 is directed into the switch housing 44 to actuate the associated audible alarm from the housing 44.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular anti-theft lift apparatus, comprising in combination,
    an elevator structure arranged for securement to a vehicular axle housing, and
    a pump means arranged for securement to said axle housing spaced from said elevator structure, the elevator structure including a mounting plate arranged for securement to said axle housing, with the mounting plate including at least one clamp member fixedly secured to said mounting plate, wherein the clamp member is arranged to receive the axle housing therethrough, and an elevator plate arranged reciprocatably relative to said mounting plate in a spaced parallel relationship thereto, the elevator plate and the mounting plate including first and second link pairs secured therebetween to effect selective extension and retraction of the elevator plate relative to the mounting plate, and
    first link pairs each including first and second link plates pivotally mounted to the respective mounting plate and elevator plate, with said first link pairs including a first axle securing said first link pairs together, with the first axle pivotally mounting each respective first link plate to one said second link plate, and each of said second link pairs includes a third link plate pivotally mounted to said mounting plate, and a fourth link plate pivotally mounted to said elevator plate, with a second axle pivotally mounted to each of said second link pairs, with said first axle arranged in a parallel spaced relationship relative to said second axle, and
    drive means secured to said mounting plate for effecting selective reciprocation of said elevator plate relative to said mounting plate.

2. An apparatus as set forth in claim 1 wherein the drive means comprises an elongate piston chamber housing fixedly mounted to said mounting plate between said mounting plate and said elevator plate in a facing relationship relative to said elevator plate, wherein the mounting plate includes a mounting plate first end and a mounting plate second end, a piston reciprocatably mounted within the piston chamber housing, and the piston having a piston rod fixedly mounted to the piston, with the piston rod projection through said piston chamber housing at said second end, with said piston rod pivotally mounted to said first axle, and a first chamber oriented within said piston chamber housing between said piston and said second end, and a second chamber oriented within said piston chamber housing between said piston and said first end, and a pressure conduit directed into said piston chamber housing in communication with said second chamber, and said pump means directing pressurized fluid into said second chamber.

3. An apparatus as set forth in claim 2 wherein said pump means includes a pump housing, said pump housing having a pump housing fluid chamber and a pump housing drive chamber, with said drive chamber having a pump member mounted within said drive chamber in communication with said fluid chamber to direct fluid from said fluid chamber into said pressure conduit, and a switch member and a battery in operative communication with said pump member to effect selective actuation of said pump member.

4. An apparatus as set forth in claim 3 including an indicator sensor mounted within said second chamber arranged to indicate positioning of said piston in adjacency to said first end.

5. An apparatus as set forth in claim 4 including an audio alarm housing mounted to said elevator plate in facing relationship relative to said mounting plate, wherein said alarm housing has an alarm rod reciprocatably mounted within said alarm housing in facing relationship relative to said mounting plate, with said audio alarm including an audio alarm switch means arranged for effecting actuation of said audio alarm upon projection of said alarm rod within said alarm housing.

6. A vehicular anti-theft apparatus, comprising in combination,
    an elevator structure arranged for securement to a vehicular axle housing, and
    a pump means arranged for securement to said axle housing spaced from said elevator structure, the elevator structure including a mounting plate arranged for securement to said axle housing, with the mounting plate including at least one clamp member fixedly secured to said mounting plate, wherein the clamp member is arranged to receive the axle housing therethrough, and an elevator plate arranged reciprocatably relative to said mounting plate in a spaced parallel relationship thereto, the elevator plate and the mounting plate including first and second link pairs secured therebetween to effect selective extension and retraction of the elevator plate relative to the mounting plate, and
    first link pairs each including first and second link plates pivotally mounted to the respective mounting plate and elevator plate, with said first link pairs including a first axle securing said first link pairs together, with the first axle pivotally mounting each respective first link plate to one said second link plate, and each of said second link pairs includes a third link plate pivotally mounted to said mounting plate, and a fourth link plate pivotally mounted to said elevator plate, with a second axle pivotally mounted to each of said second link pairs, with said first axle arranged in a parallel spaced relationship relative to said second axle, and
    drive means secured to said mounting plate for effecting selective reciprocation of said elevator plate relative to said mounting plate,
    the drive means comprises an elongate piston chamber housing fixedly mounted to said mounting plate between said mounting plate and said elevator plate in a facing relationship relative to said elevator plate, wherein the mounting plate includes a mounting plate first end and a mounting plate second end, a piston reciprocatably mounted within the piston chamber housing, and the piston having a piston rod fixedly mounted to the piston, with the piston rod projection through said piston chamber housing at said second end, with said piston rod pivotally mounted to said first axle, and a first chamber oriented within said piston chamber housing between said piston and said second end, and a second chamber oriented within said piston chamber housing between said piston and said first end, and a pressure conduit directed into said piston chamber housing in communication with said second chamber, and said pump means directing pressurized fluid into said second chamber, indicator sensor mounted within said second chamber arranged to indicate positioning of said piston in adjacency to said first end.

7. A vehicular anti-theft lift apparatus, comprising in combination, an elevator structure arranged for securement to a vehicular axle housing, and a pump means arranged for securement to said axle housing spaced from said elevator structure, the elevator structure including a mounting plate arranged for securement to said axle housing, with the mounting plate including at least one clamp member fixedly secured to said mounting plate, wherein the clamp member is arranged to receive the axle housing therethrough, and an elevator plate arranged reciprocatably relative to said mounting plate in a spaced parallel relationship thereto, the elevator plate and the mounting plate including first and second link pairs secured therebetween to effect selective extension and retraction of the elevator plate relative to the mounting plate, and first link pairs each including first and second link plate pivotally mounted to the respective mounting plate and elevator plate, with said first link pairs including a first axle securing said first link pairs together, with the first axle pivotally mounting each respective first link plate to one said second link plate, and each of said second link pairs includes a third link plate pivotally mounted to said mounting plate, and a fourth link plate pivotally mounted to said elevator plate, with a second axle pivotally mounted to each of said second link pairs, with said first axle arranged in a parallel spaced relationship relative to said second axle, and drive means secured to said mounting plate for effecting selective reciprocation of said elevator plate relative to said mounting plate, an audio alarm housing mounted to said elevator plate in facing relationship relative to said mounting plate, wherein said alarm housing has an alarm rod reciprocatably mounted within said alarm housing in facing relationship relative to said mounting plate, with said audio alarm including an audio alarm switch means arranged for effecting actuation of said audio alarm upon projection of said rod within said alarm housing.

* * * * *